(12) United States Patent
Lookingbill et al.

(10) Patent No.: US 9,291,459 B2
(45) Date of Patent: *Mar. 22, 2016

(54) VISUALIZATION OF PATHS USING GPS DATA

(71) Applicant: Google Inc., Mountain View, CA (US)

(72) Inventors: Andrew Lookingbill, Palo Alto, CA (US); Mohammed Waleed Kadous, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 14/185,375

(22) Filed: Feb. 20, 2014

(65) Prior Publication Data

US 2014/0172291 A1 Jun. 19, 2014

Related U.S. Application Data

(63) Continuation of application No. 12/898,670, filed on Oct. 5, 2010, now Pat. No. 8,694,240.

(51) Int. Cl.
| | |
|---|---|
| *G01C 21/26* | (2006.01) |
| *G01C 21/00* | (2006.01) |
| *G08G 1/01* | (2006.01) |
| *G01C 21/34* | (2006.01) |
| *G01C 21/20* | (2006.01) |
| *G01C 21/32* | (2006.01) |

(Continued)

(52) U.S. Cl.
CPC .............. *G01C 21/00* (2013.01); *G01C 21/20* (2013.01); *G01C 21/265* (2013.01); *G01C 21/32* (2013.01); *G01C 21/3492* (2013.01); *G08G 1/0112* (2013.01); *G09B 29/007* (2013.01); *G09B 29/10* (2013.01)

(58) Field of Classification Search
CPC ...... G08G 1/0112; G01C 21/00; G01C 21/20; G01C 21/265; G01C 21/3492
USPC .................. 701/412, 118, 422, 423, 439, 489
See application file for complete search history.

(56) References Cited

U.S. PATENT DOCUMENTS

| | | |
|---|---|---|
| 5,005,198 A | 4/1991 | Toda |
| 5,036,532 A | 7/1991 | Metroka et al. |

(Continued)

FOREIGN PATENT DOCUMENTS

| | | | |
|---|---|---|---|
| JP | 2005-283386 A | 10/2005 | |
| JP | 2009-109400 A | 5/2009 | |

OTHER PUBLICATIONS

"Path Tracker", Pathtracks.com, 2 pages, [online] [retrieved on Mar. 31, 2011] retrieved from the internet <URL:http://pathtracks.com/>.

(Continued)

*Primary Examiner* — Thomas G Black
*Assistant Examiner* — Wae Louie
(74) *Attorney, Agent, or Firm* — Fenwick & West LLP

(57) ABSTRACT

A map editing system for visually indicating the location of GPS devices on a map and identifying paths from the map. GPS data is received from a plurality of GPS devices. The data is filtered based parameters including the speed of the GPS devices. The filtered GPS data is displayed on a map using representations that visually indicate the location of the GPS devices that the data was received from. The representations can then be used for identifying and creating new paths on the map.

20 Claims, 4 Drawing Sheets

(51) Int. Cl.
*G09B 29/00* (2006.01)
*G09B 29/10* (2006.01)

(56) References Cited

U.S. PATENT DOCUMENTS

| | | | | |
|---|---|---|---|---|
| 6,333,703 | B1* | 12/2001 | Alewine | G08G 1/01 340/905 |
| 6,385,539 | B1* | 5/2002 | Wilson | G01C 21/30 340/905 |
| 7,221,928 | B2 | 5/2007 | Laird et al. | |
| 7,536,190 | B1 | 5/2009 | Creemer | |
| 7,557,730 | B2* | 7/2009 | Gueziec | G01C 21/3492 340/905 |
| 7,701,363 | B1* | 4/2010 | Zlojutro | G07C 5/008 340/902 |
| 7,912,628 | B2 | 3/2011 | Chapman et al. | |
| 8,000,892 | B2* | 8/2011 | Banerjee | G01C 21/20 340/988 |
| 8,099,236 | B2 | 1/2012 | Olson et al. | |
| 8,103,439 | B2 | 1/2012 | Onishi et al. | |
| 8,160,805 | B2 | 4/2012 | Downs et al. | |
| 8,260,542 | B2 | 9/2012 | Kimishima | |
| 8,275,490 | B2 | 9/2012 | Brusilovsky et al. | |
| 8,386,157 | B2 | 2/2013 | Kim | |
| 8,694,240 | B1* | 4/2014 | Lookingbill | G01C 21/00 455/456.1 |
| 8,694,241 | B1* | 4/2014 | Kadous | G08G 1/0112 701/118 |
| 2004/0002366 | A1 | 1/2004 | Cromer et al. | |
| 2004/0097275 | A1 | 5/2004 | Ohno et al. | |
| 2004/0102893 | A1* | 5/2004 | Atkinson | H04W 4/02 701/117 |
| 2004/0204840 | A1* | 10/2004 | Hashima | G01C 21/265 701/526 |
| 2007/0038364 | A1* | 2/2007 | Lee | G01C 21/20 701/532 |
| 2007/0072553 | A1 | 3/2007 | Barbera | |
| 2008/0033635 | A1* | 2/2008 | Obradovich | H04L 29/12122 701/533 |
| 2008/0082254 | A1* | 4/2008 | Huhtala | G01C 21/00 701/533 |
| 2008/0234921 | A1* | 9/2008 | Groenhuijzen | G01C 21/3415 701/118 |
| 2008/0300782 | A1 | 12/2008 | Kohno et al. | |
| 2008/0312819 | A1* | 12/2008 | Banerjee | G01C 21/20 701/433 |
| 2009/0029687 | A1* | 1/2009 | Ramer | G06Q 30/06 455/414.3 |
| 2009/0281719 | A1* | 11/2009 | Jakobson | G06Q 30/02 701/439 |
| 2010/0125409 | A1 | 5/2010 | Prehofer | |
| 2010/0156709 | A1 | 6/2010 | Zhang et al. | |
| 2010/0332119 | A1 | 12/2010 | Geelen et al. | |
| 2011/0015817 | A1 | 1/2011 | Reeve | |
| 2011/0106416 | A1* | 5/2011 | Scofield | G08G 1/0104 701/119 |
| 2011/0199259 | A1 | 8/2011 | Karaoguz et al. | |
| 2011/0224893 | A1* | 9/2011 | Scofield | G01C 21/3492 701/119 |
| 2011/0224898 | A1* | 9/2011 | Scofield | G01C 21/3492 701/532 |
| 2012/0021717 | A1 | 1/2012 | Schmidt | |
| 2012/0046860 | A1 | 2/2012 | Curtis et al. | |
| 2012/0053823 | A1 | 3/2012 | Wilson | |
| 2012/0109517 | A1 | 5/2012 | Watanabe | |
| 2012/0115505 | A1* | 5/2012 | Miyake | G06Q 10/06 455/456.1 |
| 2012/0253656 | A1 | 10/2012 | Brandt | |
| 2012/0303271 | A1 | 11/2012 | Chowdhary et al. | |
| 2012/0316774 | A1 | 12/2012 | Yariv et al. | |
| 2012/0330544 | A1 | 12/2012 | Joong et al. | |
| 2013/0006517 | A1* | 1/2013 | Ofek | G01C 21/3446 701/411 |
| 2014/0172291 | A1* | 6/2014 | Lookingbill | G01C 21/00 701/409 |

OTHER PUBLICATIONS

"Global Positioning System" Wikipedia, Last Modified on Mar. 28, 2011, 17 pages, [online] [retrieved on Mar. 31, 2011] retrieved from the internet <URL:http://en.wikipedia.org/wiki/Global_Positioning_System>.

Lester, J., et al., "MobileSense—Sensing Modes of Transportation in Studies of the Built Environment," International Workshop on Urban, Community and Social Applications of Networked Sensing Systems, Nov. 4, 2008, pp. 46-50.

Schussler, N., et al., "Identifying trips and activities and their characteristics from GPS raw data without further information" 8$^{th}$ International Conference on Survey Methods in Transport, Annecy, May 2008, pp. 1-28.

Stopher, P., et al., "Deducing mode and purpose from GPS data" Institute of Transport and Logistics Studies, Apr. 2008, pp. 1-13.

Upadhyay, et al., "Optimal parameter values for mode detection in GPS post-processing: An experiment" Working Paper, 507, IVT, ETH Zurich, Zurich, Jul. 2008, 23 Pages.

Welbourne, E., et al., "Mobile Context Inference Using Low-Cost Sensors," T. Strang and C. Linnhoff-Popien: LoCA 2005, LNCS 3479, pp. 254-263.

PCT International Search Report and Written Opinion, PCT/US2012/030978, Oct. 28, 2012, 8 Pages.

Office Action for U.S. Appl. No. 12/898,670, Jun. 20, 2013, 14 Pages.

* cited by examiner

VISUALIZATION OF PATHS USING GPS DATA

CROSS REFERENCE TO RELATED APPLICATIONS

This application is a continuation of U.S. patent application Ser. No. 12/898,670, filed on Oct. 5, 2010 and titled "Visualization of Paths Using GPS Data," the contents of which are incorporated by reference herein in their entirety.

BACKGROUND

1. Field of Art

The present invention relates to generating maps using data gathered from global positioning system (GPS) devices.

2. Description of Related Art

Generally, GPS devices communicate with satellites to determine the precise location of the device. GPS devices are commonly used in navigation and route guidance systems. In part due to the popularity of such navigation and route guidance systems, GPS technology has been included in a variety of consumer products ranging from vehicles to mobile devices.

SUMMARY

A map editing system that receives data from a plurality of GPS devices, filters the data, and displays the data on map using representations that visually indicate the location of the GPS devices. Data, such as location and speed of travel, is received from a plurality of GPS devices. GPS devices can be, for example, GPS equipped mobile phones or GPS receivers. The data is filtered based on parameters including the speed of the GPS devices. The parameters can be set to identify a GPS device most likely being used by a given class of users, such as walkers, runners, bicyclists, and forth. The filtered data is then displayed on a map using representations that visually indicate the location of the GPS devices.

In certain implementations, the map editing system identifies areas in the map that have a high-density of representations. These areas are presented to a user of the map editing system who then uses his or her judgment to create a path on the map based upon the representations at these areas. A path can be a pedestrian path, for example, where there are a high concentration of samples at speeds indicating walking. This is useful to identify paths that otherwise do not appear on conventional digital or paper maps. In other implementations, the map editing system can automatically create a path based on the locations of the filtered samples.

One skilled in the art will readily recognize from the following discussion that alternative embodiments of the structures and methods illustrated herein may be employed without departing from the principles of the invention described herein.

DETAILED DESCRIPTION OF THE EMBODIMENTS

Embodiments of the present invention provide systems, methods, and computer-readable storage media for representing and displaying on a map the location of GPS devices. A GPS device can gather data about the location, direction of travel, and speed of travel of an individual carrying the GPS device. The GPS data can be displayed as a representation on a map. The term path, as used herein, entails any path, road, street, highway, or unpaved road on which individuals can travel. In one embodiment, the path is a pedestrian and/or bicycle path that is used primarily by individuals for walking, hiking, jogging, running, bicycling, skating, or other forms of human powered transport. A "map," as used herein, refers to any physical or digital representation of a region of the Earth, including a representation of the surface of the Earth or paths on the surface of the Earth.

System Architecture

Figure 1:
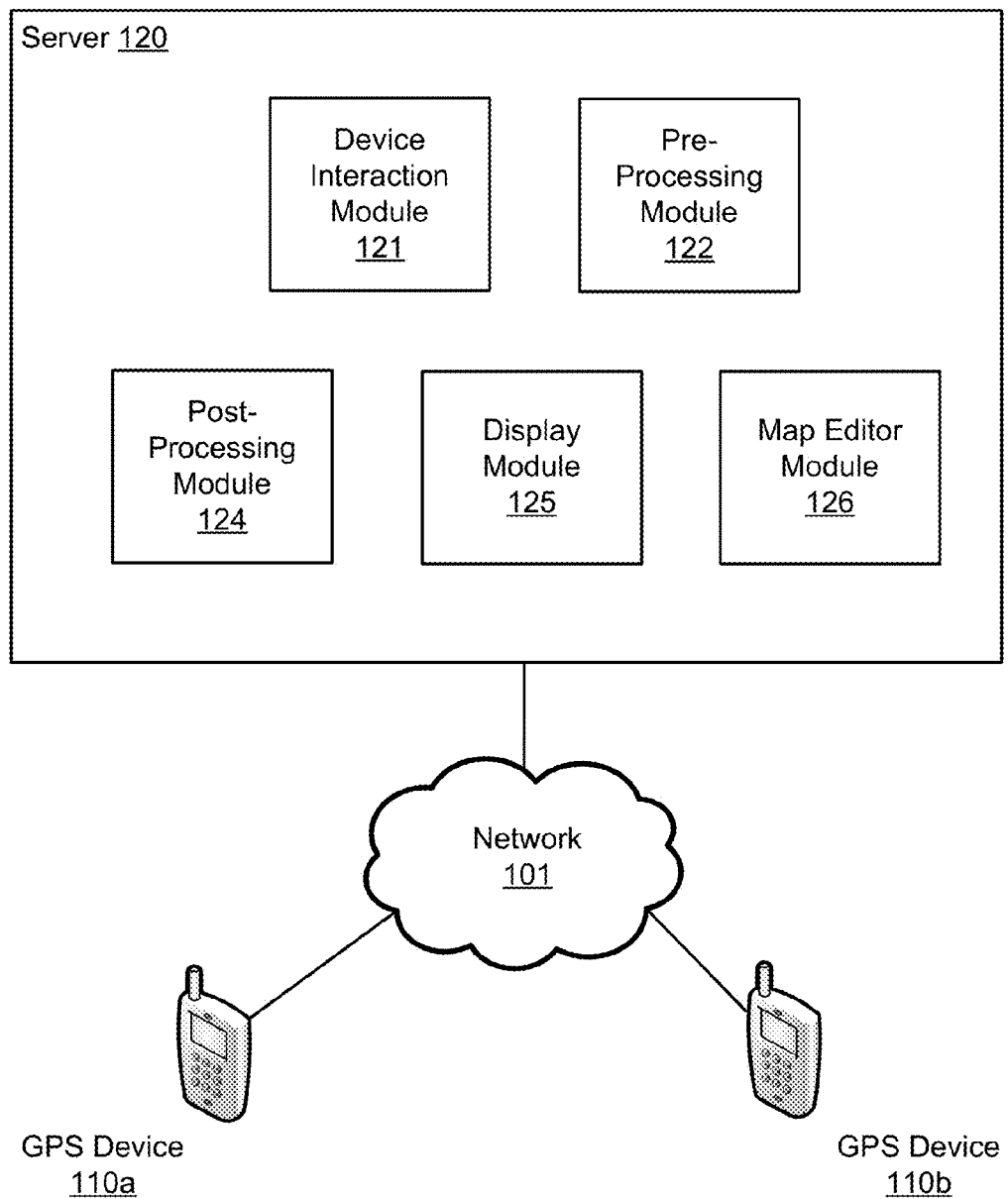
FIG. 1 is a high-level block diagram of a map editing system in accordance with an embodiment.

FIG. 1 is a high level block diagram of a map editing system 100 according to one embodiment. The system 100 includes a network 101, at least one GPS device 110 and a server 120.

The network 101 represents the communication pathways between the server 120 and the GPS devices 110. In one embodiment, the network 101 is the Internet and uses standard communications technologies and/or protocols. The network 101 can also utilize dedicated, custom, or private communications links that are not necessarily part of the Internet.

The system environment 100 also includes at least one GPS device 110. The GPS device 110 can be any mobile device equipped with GPS, such as a smart phone, personal digital assistant (PDA), or a dedicated GPS receiver/transmitter. In general a person carries a GPS device 110 while walking, bicycling, skating, or the like. FIG. 1 illustrates two GPS devices 110 for clarity; in practice, there will be hundreds and likely thousands of GPS devices 110 from which GPS data is received.

A GPS device 110 produces GPS data, which is communicated to the server 120 via the network 101. The GPS data that is produced by a GPS device 110 is referred to herein as a "GPS sample." A GPS sample can include data about the location, the direction of travel, and/or the speed of travel of a GPS device 110, or more specifically the individual carrying the GPS device 110, at a given point in time. In some embodiments, the GPS sample may include the location and the speed of travel of the GPS device 110 or just the location of the GPS device 100. A GPS sample may also include other information, such as identifying information for the GPS device.

A GPS device 110 includes a GPS receiver chipset. A GPS receiver chipset can receive several types of differential signals, such as a wide-area augmentation system (WAAS) signals, subscription L-Band signals, or a combination of signal options. A GPS device 110 also includes an antenna that is tuned to the frequencies transmitted by satellites, receiver-processors, and a highly stable clock. A GPS device 110 may also include a display for providing location and speed information to the user.

The server 120 includes a device interaction module 121, a pre-processing module 122, a post-processing module 124, a display module 125, and a map editor module 126.

The device interaction module 121 communicates with a plurality of GPS devices 110 and receives GPS samples from the GPS devices 110. The GPS device interaction module 121 can be configured to receive GPS samples from various types of GPS devices 110. The GPS device interaction module 121 sends data about the location of GPS devices 110 to the pre-processing module 122.

The pre-processing module 122 receives the data from the device interaction module 121. The pre-processing module 122 determines the location and speed of travel for the GPS devices 110 from the GPS samples. The pre-processing module can also determine other information from the GPS samples, such as a direction of travel. This information is then stored into a database and later retrieved for further processing.

The post-processing module 124 retrieves GPS samples from the database and filters the GPS samples. In one embodiment, the filtering criteria used by the processing module 124 can be selected to identify samples within particular speed ranges as a way of identifying classes of users, such as walkers, bicyclists, and the like. The post-processing module 124 also generates representations for the filtered GPS samples, and identifies candidates for the filtered GPS samples. The representation can be a digital or visual image, graphic, icon, or the like. In one embodiment, the representation is a circular icon. Candidates represent areas where a high-density of filtered GPS samples are located, and can be used to identify areas where paths may exist. The process is described in detail with reference to FIG. 3.

The display module 125 formats the representations and candidates for display on a display device of the server 120. In other embodiments, the display module 125 transmits the representations and candidates for display on a display device that is remote from the server 120. The remote display device can be, for example, a computer (not shown) that is connected to the network 101.

The map editor module 126 is configured to construct a path on the map in response to information received from a user of the map. In practice, the map editor module 126 is used during the construction of digital maps by a map developer, (as contrasted to an end user who simply receives and views a map that has been previously constructed, as for example when viewing navigation directions on a map). The user views the plurality of representations on the map and sends information about a path to the map editor module 126. The user then controls the map editor module 126 to flag, edit, label, create, or alter any information or feature about the paths on a map. The updated path information is later used in various ways, such as to generate a map for display on an end user device (e.g., a map equipped mobile phone or a GPS receiver), and the generation of navigation directions.

Figure 2:
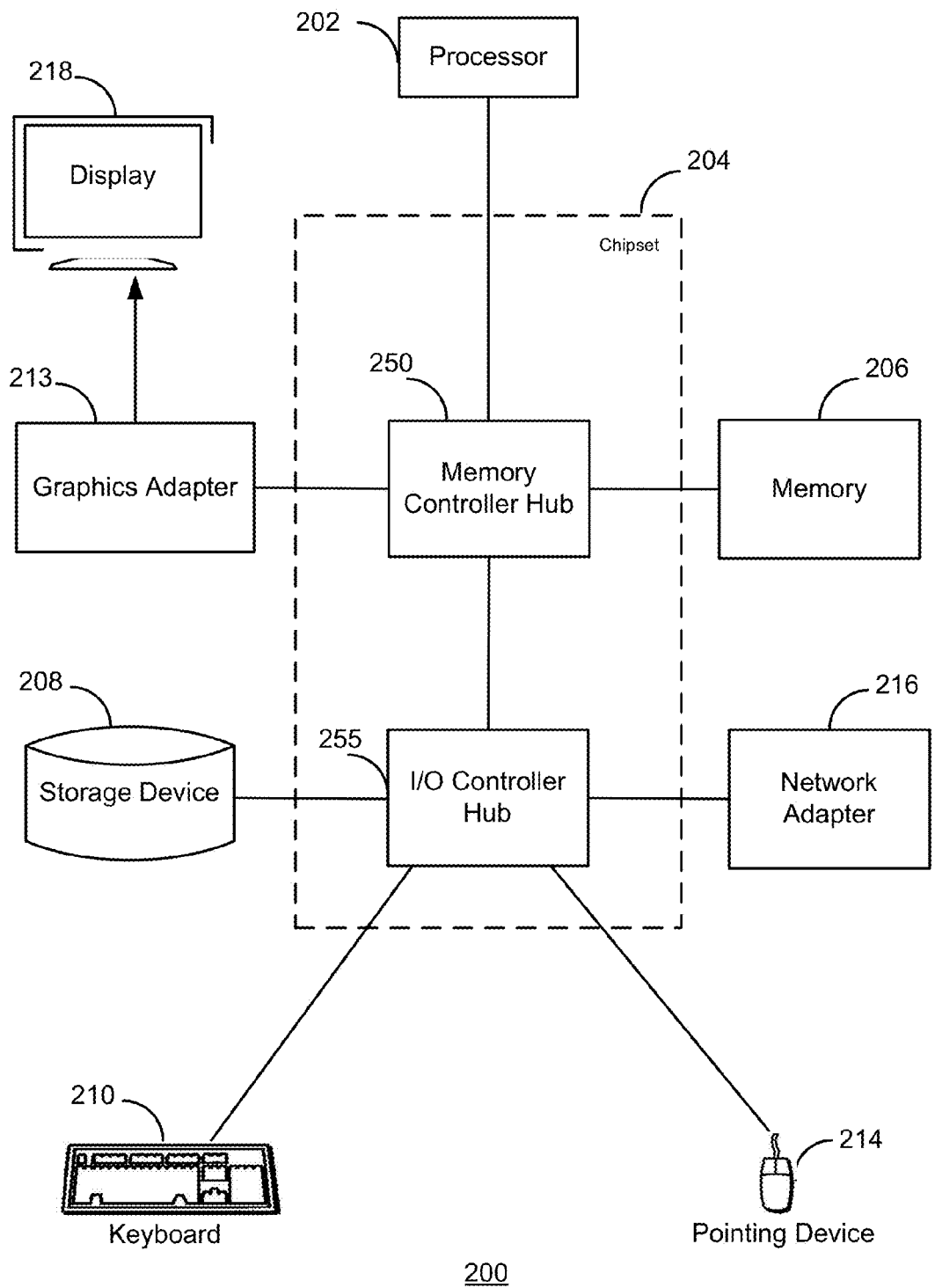
FIG. 2 is a high-level block diagram illustrating an example of a computer for use as a server, in accordance with an embodiment.

FIG. 2 is a high-level block diagram illustrating an example of a computer 200 for use as a server 120, in accordance with an embodiment of the invention. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

a. The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. Mechanisms used to convey user input can include, but are not limited to, touchscreen interfaces, touchpads, directional pointing devices, voice controlled interfaces, hardware keyboard shortcuts, directional hardware keys and hardware elements such as wheels and rolling balls. The graphics adapter 213 displays images and other information on the display device 218. In some embodiments, the display device 218 includes a touch screen capability for receiving user input and selections. The network adapter 216 couples the computer system 200 to the communications network 101. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a server 120 may comprise multiple interconnected individual servers working together to provide the functionality described herein.

Method of Path Visualization

Figure 3:
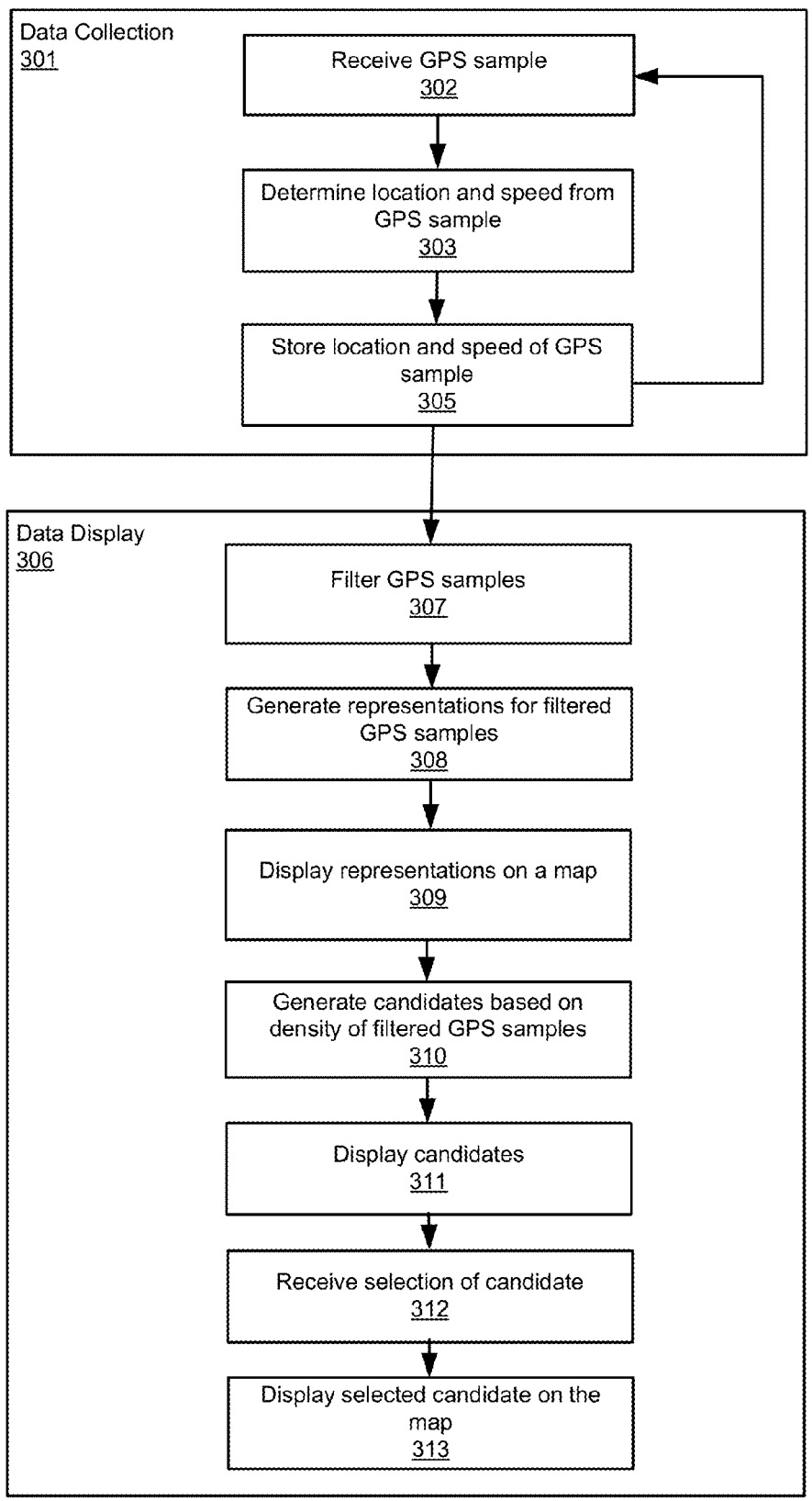
FIG. 3 is a flow diagram illustrating the steps of a method of path visualization, in accordance with an embodiment.

FIG. 3 shows a flow diagram of a method of path visualization using GPS data collected from GPS devices 110, according to an embodiment. The method illustrated in FIG. 3 is performed by modules within the server 120. As shown, the method includes a data collection stage 301 and data display stage 306. Each stage is further subdivided into multiple steps, which are now described in greater detail.

In step 302 of the data collection stage 301, a GPS sample is received from a GPS device 110. As described above, a GPS sample may include the location, direction of travel, and/or speed of travel of a GPS device 110 at a given point in time. The GPS sample may also include identifying information about the GPS device 110. The device interaction module 121 can remove the identifying information upon receipt of the GPS sample from the GPS device 110. A series of GPS samples received from a single GPS device 110 can also be assigned a unique identifier so that when the GPS samples are processed at a later stage, the series of GPS samples can easily be associated with a single GPS device 110.

In one embodiment, a GPS sample received from a GPS device includes additional data from which the mode of transportation used in connection with the GPS device can be inferred. For example, the GPS device may include data indicating whether the GPS device is plugged into a power source. This information can be used to distinguish an individual carrying a mobile device while traveling in a car (i.e., using the car's 12 volt power supply) from an individual carrying a battery-powered mobile device while walking.

In some embodiments, the GPS sample is received according a specific upload pattern. The GPS device interaction module 121 can receive the GPS sample at regular intervals. For instance, the GPS sample can be received at regular distance intervals (e.g., every 100 meters) or at regular time intervals (e.g., once per minute). In other embodiments, the GPS sample is collected in short intervals or bursts, such that there is a dense sampling of GPS data in a short time period.

In step 303 the location and speed of travel is determined from the GPS sample. In some embodiments, the location data includes the latitude and longitude of the GPS device 110. For instance, the location data for a GPS device may include a latitude of 41.8967° N and a longitude of −87.6241° W. The latitude and longitude data can be received in the form of coordinates such as 41° 53' 48" N and 87° 37' 27" W. Based on the latitude and longitude, the location module 122 can use map data (stored locally in the server 120 or accessed remotely) to determine the location of the GPS device 110 on a map.

If the GPS sample includes speed of travel data, the speed of travel can be extracted from the GPS sample itself. Alternatively, if the GPS sample does not include speed of travel data, the GPS device interaction module 121 can determine the speed of travel from the location of the GPS device 110 at two points in time ($t_0$ and $t_1$).

In some embodiments, a direction of travel can also be determined from the GPS sample itself. The direction may be relative to points on a fixed compass, such as cardinal points (north, south, east and west) or intermediate directions (northeast, southeast, southwest, northwest) or headings. Alternatively, the direction data may include information about the degrees of rotation relative to a 360 degree compass. For instance, a vehicle facing directly east can correspond to a direction of 90 degrees.

In step 305, the location and speed of travel information for a GPS sample is stored into a database. Other information, such as the direction of travel, an identifier for a series of GPS samples, and whether the GPS device is plugged into a power source can also be stored for a GPS sample. The data can be stored for an indefinite period of time to be displayed on a map at a later time.

The operations of data collection 301 are repeated with respect to a large number of GPS devices 110 over an extended period of time, such as an hour, a day, a week, etc. depending on the particular application for which the collected information is to be used. For example, a system administrator can configure the server 120 to collect several hundred or thousands of GPS samples from numerous devices 110 passing through a given park over a one week period in order to locate walking, bicycling or similar non-motor vehicle paths in the park. In addition, the individual steps during the data collection stage 301 can be performed asynchronously from (and in parallel with) each other and when collecting large numbers of GPS samples. Thus, for example, a large number of samples can be first collected and stored, and then subsequently processed to determine location and speed. Similarly, multiple threads can be operating concurrently to collect, analyze, associate and store the samples.

FIG. 3 also illustrates the steps of the data display stage 306, in which data derived from the GPS sample is displayed on a map. The operations of data display stage 306 are asynchronous from the operations of data collection 301; thus, a large number of GPS samples can be collected 301, and then subsequently displayed 306 as needed; in addition, both stages 301, 306 can be operating concurrently.

In step 307, the GPS samples are filtered, resulting in a sub-set of GPS samples (the "filtered samples"). In one embodiment, GPS samples can be filtered by speed of travel according to filtering rules. Filtering by speed of travel is a proxy for identifying the mode of transportation or a class of user (e.g. pedestrian, bicyclist, motor vehicle) used in connection with the GPS device. For example, pedestrians typically travel a slow rate of speed, bicyclists travel at a medium rate of speed, and individuals in motor vehicles travel at a high rate of speed.

For each class of user/mode of travel of interest, a range of speeds (i.e., upper and lower speed thresholds) can be defined for the class as a set of filtering rules. GPS samples can be filtered by comparing each GPS sample, or more specifically the speed of travel of each GPS sample, to a range of speeds for one or more of the classes. If the GPS sample is within the speed range for the class, the GPS sample is associated with that class. The threshold speeds can be set to any arbitrary values depending on the objective of the filtering step. For example, for identifying GPS samples received from pedestrians, the lower threshold speed can be 0 mph, and the upper threshold speed can be 5 mph. Any GPS samples exceeding the upper threshold are filtered out and not included in the pedestrian class. For identifying GPS samples received from bicyclists, the lower threshold speed can be 6 mph, and the upper threshold speed can be 15 mph. Any GPS samples that fall outside of this threshold range are filtered out and not included in the bicyclist class. For identifying GPS samples received from individuals in vehicles, the lower threshold speed can be 20 mph and the upper threshold can be unbounded. Any GPS samples that fall below the lower threshold are filtered out and not included in the vehicle class.

Alternatively, instead of analyzing each GPS sample in isolation, GPS samples can be filtered by comparing a series of GPS samples received from a single GPS device to a threshold or range of speeds. The device-specific series of GPS samples can be any number of samples, such as samples received within a certain time window (e.g. 5 minutes of samples) or a pre-determined number of samples (e.g. 50 samples) from a single GPS device. Given a large number of samples, such as 10,000 samples received over a 24 hour period, there may be only 500 devices to be considered and each GPS device can have one or more series of samples. For example, an individual may walk into a park, thus creating a first series of samples. The individual stops and rests for 20 minutes. The individual then walks out of the park, creating a second series of samples. Each of these series would be separately evaluated.

If any GPS sample in a device-specific series has a speed of travel that does not meet the threshold or does not fall within the range for the class, then that series of GPS samples from that device is filtered out (though other series of samples from that GPS device are still considered independently). Filtering GPS samples in this manner helps to eliminate false positives. For example, suppose the system is configured to identify pedestrians by filtering out GPS samples with speeds that are greater than 5 mph. A series of GPS samples received from a single GPS device could be (3 mph, 3 mph, 3 mph, 25 mph, 3 mph, 3 mph, and 3 mph). Pedestrians do not typically increase their speed from 3 mph to 25 mph while traveling on foot. This anomaly is an indication that the series of GPS samples represents something other than a pedestrian, such as a vehicle stuck in traffic. Thus, the entire series of GPS samples is filtered out and not included in the pedestrian class.

In another embodiment, GPS samples can be filtered based on other indicators of how a GPS device is carried. For instance, if a GPS sample includes information about whether a GPS device is plugged into a power source, this information can be used to distinguish between a GPS device carried by a person and a GPS device that is in a vehicle. These factors can be used, either alone or in combination with the speed of travel information, to filter GPS samples.

The filtering of GPS samples into classes may also be done using a classification model, such as a Bayes theorem, where the probability $P(A|B)$ of a GPS sample at speed B being in a class A (e.g., pedestrians) is conditioned upon the probability $P(A)$ of a sample from class A, and the probability $P(B|A)$ of sample at speed B, given samples in the class, and the probability $P(B)$ of a sample at speed B. This approach can be combined with the filtering rules as well.

In step 308, a representation is generated for each filtered sample. In some embodiments, the representation is a circle. Alternatively, various other shapes, forms or images may be used as representations of the filtered samples.

In step 309, the representations are displayed on a map to a user of the map editing system 100, for example, by the display module 125 on the server 120. In other embodiments, the representation is formatted by the display module 125 for display at a remote display device.

Figure 4:
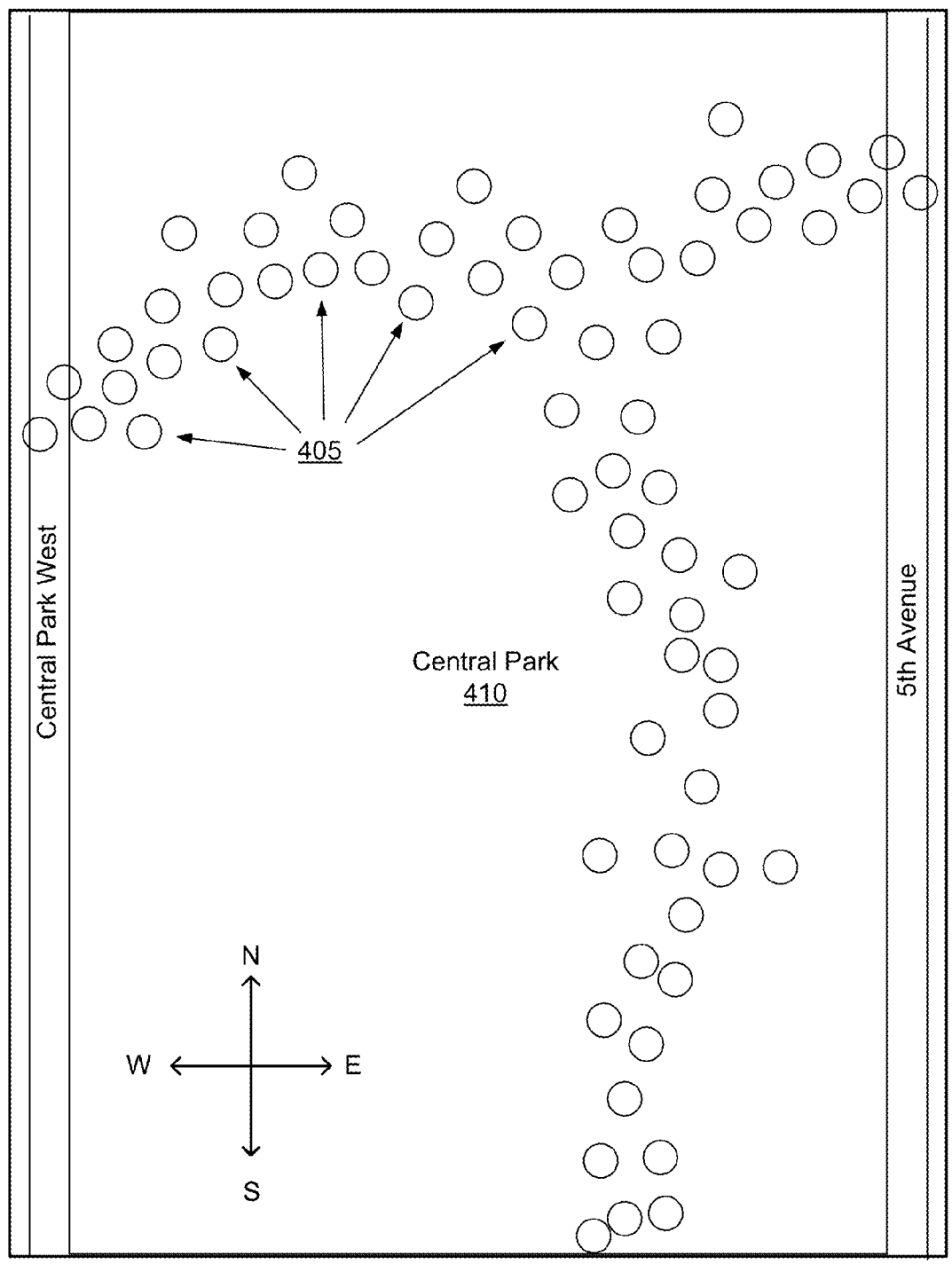
FIG. 4 is a user interface for path visualization, in accordance with an embodiment.

FIG. 4 is an interactive digital map for path visualization, according to one embodiment. As shown, the map 400 includes a portion of Central Park 410 in New York City that is bordered on the west side by Central Park West and on the east side by 5th Avenue. The circles 405 are the representations of filtered samples received from GPS devices in Central Park 410. To further explain, if the GPS samples were filtered to only include GPS devices carried by slow moving individuals, then the representations 405 are probably located on or near a pedestrian path. If the GPS samples were filtered to only include GPS devices carried by fast moving individuals (e.g., samples greater than 15 mph), then the representations 405 are probably located on or near a road carrying vehicle traffic that crosses through Central Park 410.

Referring back to FIG. 3, in step 310, "candidates" are generated based on densities of the filtered samples. Candidates are geographical areas where a high-density of filtered samples is located. Within each candidate, there may be one or more paths. Since the filtered samples may be located over many square miles, generating candidates assists a user of the map editing system 100 in focusing on areas of importance. For example, if the GPS samples are filtered for low speed GPS devices, a candidate probably represents a geographical area where pedestrians tend to gather. Within the candidate, there is a high probability that one or more pedestrian paths exist.

In one embodiment, candidates are identified by dividing a surface region of the Earth into individual areas of interest, such as tiles of a certain size (e.g., 200 meters long by 200 meters wide). The locations of filtered samples are matched against the locations of the areas of interest in order to place each filtered sample within an area of interest. The sample density of the area is then determined. If the density of samples within an area of interest is greater than a threshold value, the area of interest is identified as a candidate. Threshold can be based on simple counts (e.g., more than 10,000 samples), or by distributions (e.g., number of samples is above two standard deviations from mean), or other means. The threshold can be set, for example, in accordance with pre-defined system settings or by a user of the map editing system 100.

In step 311, the candidates are displayed by the display module 125 to a user of the map editing system 100. In other embodiments, the representation is formatted by the display module 125 for display at a remote display device. In one embodiment, the candidates are displayed as an interactive list of candidates. The list can be displayed, for example, by incorporating the list into the displayed map, or in a window that is separate from the displayed map.

Additionally, candidates in the list can be prioritized based on the density of filtered samples within an area of interest. For example, an area of interest that includes 200 filtered samples can be given a higher priority than an area of interest with 10 filtered samples. Candidates can be displayed along with information such as the location of and density of filtered samples within the candidate. To simplify the display, candidates that have already been evaluated by a user of the map editing system 100 can be hidden from view.

In step 312, the map editor module 126 receives a user input selecting a candidate from the displayed candidates. The user input can be in any form, such as a mouse click or a keyboard entry selecting a candidate from a list. Identifying, displaying, and receiving selection of candidates in this manner facilitates quick processing of areas on the map that are likely to contain high-traffic paths.

In step 313, the candidate selected by the user input is displayed in the map. In one embodiment, the selected candidate is displayed in the map with a visual indicator that corresponds to the location of the candidate. For example, if the selected candidate is located in Central Park in New York City, a digital map of the United States would include a visual indicator, such as an icon, located on or near New York City. In another embodiment, the candidate is displayed by focusing the map on, or zooming in on, the location of the selected candidate. For example, if the selected candidate is located in Central Park, the system would focus the map on Central Park and the map would have an appearance that is similar to that shown in FIG. 4, including the displayed representations 405 of GPS devices.

Referring back to FIG. 3, although steps 307-313 are shown as sequential steps, it is not necessary that these steps be performed in this order. Some steps can be performed asynchronously from (and in parallel with) each other. For example, representations in step 308 and candidates in step 310 can be generated at the same time. Also, representations in step 309 and candidates in step 311 can be displayed at the same time in separate windows.

Creating Paths

Once the filtered samples are displayed as representations and located in the map by a user of the map editing system 100, the user can analyze the display and instruct the map editor module 126 to create a new path, modify an existing path, or attach a label to a path describing characteristics of the path. For example, referring again to FIG. 4, the circles 405 are representations of filtered samples. If the GPS samples were filtered to only include GPS devices carried by slow moving individuals, then the representations are probably located on or near a pedestrian path. A user of the map editing system 100 can use the functionality of the map editor module 126 (e.g. with a line or curve tool) to draw a path on or near the location of the representations 405. In one embodiment, the path is a series of connected line segments. The user can also instruct the map editor module 126 to label the path as a "pedestrian path." In some embodiments, additional indicators can be displayed to assist a user in verifying the location of a path, such as a satellite or aerial imagery that shows the location of a path.

Alternatively, the map editor module 126 can automatically create a path that approximates the locations of the filtered samples. In one embodiment, the path can be created by fitting a sequence of line segments to the filtered samples that minimizes a least squares error between the line segments and filtered samples. The path can also be created by minimizing a cost function that is based on both the least squares error and the number of line segments in the path. Additionally, using the speed of travel for the filtered samples, the map editor module 126 can automatically attach a label (e.g. pedestrian, bike, road) to the path. The automatically created paths can be displayed to a user who then verifies that the path is in the correct location or makes further edits to the path.

The present invention has been described in particular detail with respect to several possible embodiments. Those of skill in the art will appreciate that the invention may be practiced in other embodiments. It is also appreciated that embodiments of the invention may be practiced in other communications network environments that include components to enable the data collection and data display steps, as described above.

The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be persistently stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not described with reference to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method for visualizing position data on a map, comprising:
   receiving position samples from a plurality of devices, each position sample comprising a location of a device from which the position sample is received;
   determining travel speeds of the plurality of devices from the position samples;
   filtering the position samples into filtered position samples based on the travel speeds of the devices; and
   generating, for display on the map, a plurality of representations for the filtered position samples, each representation visually indicating the location of a device that provided a filtered position sample.

2. The computer-implemented method of claim 1, wherein the position samples are satellite positioned samples.

3. The computer-implemented method of claim 1, wherein the position samples are filtered into filtered position samples corresponding to a mode of transportation, and wherein the plurality of representations correspond to a path for the mode of transportation.

4. The computer-implemented method of claim 3, wherein filtering the position samples comprises:
   establishing a filtering rule for the mode of transportation, the filtering rule comprising a lower threshold speed and an upper threshold speed; and
   applying the filtering rule to the position samples.

5. The computer-implemented method of claim 3, wherein the mode of transportation comprises at least one of: walking, biking, and driving.

6. The computer-implemented method of claim 1, further comprising:
   generating a plurality of candidates for display based on densities of the filtered position samples, wherein a candidate corresponds to an area in the map;
   receiving a selection of a candidate of the plurality of candidates from a user viewing the plurality of candidates; and
   outputting a visual indication of the selected candidate for display on the map.

7. The computer-implemented method of claim 1, further comprising:
   receiving an indication of a path location in the map from a user viewing the map; and
   creating a new path based on the received indication of the path location.

8. A non-transitory computer-readable storage medium storing executable computer program instructions for visualizing position data on a map, the computer program instructions comprising instructions for:

receiving position samples from a plurality of devices, each position sample comprising a location of a device from which the position sample is received;

determining travel speeds of the plurality of devices from the position samples;

filtering the position samples into filtered position samples based on the travel speeds of the devices; and generating, for display on the map, a plurality of representations for the filtered position samples, each representation visually indicating the location of a device that provided a filtered position sample.

9. The computer-readable storage medium of claim 8, wherein the position samples are satellite positioned samples.

10. The computer-readable storage medium of claim 8, wherein the position samples are filtered into filtered position samples corresponding to a mode of transportation, and wherein the plurality of representations correspond to a path for the mode of transportation.

11. The computer-readable storage medium of claim 10, wherein filtering the position samples comprises:

establishing a filtering rule for the mode of transportation, the filtering rule comprising a lower threshold speed and an upper threshold speed; and applying the filtering rule to the position samples.

12. The computer-readable storage medium of claim 10, wherein the mode of transportation comprises at least one of: walking, biking, and driving.

13. The computer-readable storage medium of claim 8, the instructions further comprising additional instructions for:

generating a plurality of candidates for display based on densities of the filtered position samples, wherein a candidate corresponds to an area in the map;

receiving a selection of a candidate of the plurality of candidates from a user viewing the plurality of candidates; and outputting a visual indication of the selected candidate for display on the map.

14. The computer-readable storage medium of claim 8, the instructions further comprising additional instructions for:

receiving an indication of a path location in the map from a user viewing the map; and creating a new path based on the received indication of the path location.

15. A system for visualizing position data on a map, comprising:

a computer processor; and a non-transitory computer readable medium storing instructions that are executable by the computer processor for:

receiving position samples from a plurality of devices, each position sample comprising a location of a device from which the position sample is received;

determining travel speeds of the plurality of devices from the position samples;

filtering the position samples into filtered position samples based on the travel speeds of the devices; and generating, for display on the map, a plurality of representations for the filtered position samples, each representation visually indicating the location of a device that provided a filtered position sample.

16. The system of claim 15, wherein the position samples are filtered into filtered position samples corresponding to a mode of transportation, and wherein the plurality of representations correspond to a path for the mode of transportation.

17. The system of claim 16, wherein filtering the position samples comprises:

establishing a filtering rule for the mode of transportation, the filtering rule comprising a lower threshold speed and an upper threshold speed; and applying the filtering rule to the position samples.

18. The system of claim 16, wherein the mode of transportation comprises at least one of: walking, biking, and driving.

19. The system of claim 15, wherein the instructions are further executable by the processor for:

generating a plurality of candidates for display based on densities of the filtered position samples, wherein a candidate corresponds to an area in the map;

receiving a selection of a candidate of the plurality of candidates from a user viewing the plurality of candidates; and outputting a visual indication of the selected candidate for display on the map.

20. The system of claim 15, wherein the instructions are further executable by the processor for:

receiving an indication of a path location in the map from a user viewing the map; and creating a new path based on the received indication of the path location.

* * * * *